United States Patent [19]

Furtek

[11] Patent Number: 4,876,229
[45] Date of Patent: Oct. 24, 1989

[54] CATALYST COMPOSITION FOR POLYMERIZING OLEFINS OF NARROW MOLECULAR WEIGHT DISTRIBUTION AND POLYMERIZATION THEREWITH

[75] Inventor: Allan B. Furtek, Warren, N.J.

[73] Assignee: Mobil Oil Corporation, New York, N.Y.

[21] Appl. No.: 200,403

[22] Filed: May 31, 1988

[51] Int. Cl.$^4$ .............................................. C08P 4/64
[52] U.S. Cl. ..................... 502/107; 502/104; 502/115; 502/120; 502/126; 502/132; 502/112; 526/129
[58] Field of Search ............... 502/104, 107, 115, 120, 502/126, 132, 112

[56] References Cited

U.S. PATENT DOCUMENTS

| | | | |
|---|---|---|---|
| 3,135,809 | 6/1964 | Bosmajian | 502/114 X |
| 4,481,301 | 11/1984 | Nowlin et al. | 501/120 X |
| 4,521,573 | 6/1985 | Lee et al. | 526/125 |
| 4,670,413 | 6/1987 | Furtek | 502/104 X |

OTHER PUBLICATIONS

McDaniel, *Fracturing Silica-Based Catalysts During Ethylene Polymerization*, Journal of Polymer Science: Polymer Chemistry Edition, vol. 19, 1967–1976 (1981).

Shida et al., *A Study of Supported Magnesium Titanium Catalysts*, Polymer Preprints (ACS Division of Polymer Chemistry) 24, 1, pp. 110–111 (1983).

Hogan et al., *Phillips Petroleum Company Loop Reactor Polyethylene Technology*, Journal of Applied Polymer Science: Applied Polymer Symposium, 36, 49–60 (1981).

*Primary Examiner*—Patrick P. Garvin
*Attorney, Agent, or Firm*—Alexander J. McKillop; Charles J. Speciale; Stanislaus Aksman

[57] ABSTRACT

An olefin, particularly alpha-olefin, supported catalyst composition, containing a transition metal or a compound thereof and an activator, has an average pore diameter of about 20 to about 300 Angstroms, at a substantially constant catalyst particle size for a given range of average pore diameters. The catalyst produces polymers having gradually decreasing molecular weight distribution with decreasing pore size of the catalyst at a constant particle size.

62 Claims, 2 Drawing Sheets

CATALYST COMPOSITION FOR POLYMERIZING OLEFINS OF NARROW MOLECULAR WEIGHT DISTRIBUTION AND POLYMERIZATION THEREWITH

BACKGROUND OF THE INVENTION

1. Field of the Invention

The present invention relates to a catalyst for polymerizing olefins, particularly alpha-olefins, a method for producing such a catalyst and to a polymerization process utilizing the catalyst which produces polymer products having narrow molecular weight distribution. A particular aspect of the present invention relates to a method for preparing a supported catalyst composition which produces polymers whose melt flow ratio (MFR) decreases with the decreasing catalyst average pore size at a substantially constant catalyst particle size. MFR, as is known to those skilled in the art, is an indication of polymer's molecular weight distribution. Lower MFR values indicate narrower molecular weight distribution of the polymer than higher MFR values.

2. Description of the Related Art

Linear low density polyethylene possess properties which distinguish them from other polyethylene polymers, such as ethylene homopolymers. Certain of these properties are described by Anderson et al, U.S. Pat. No. 4,076,698.

Karol et al, U.S. Pat. No. 4,302,566, describe a process for producing linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Stevens et al, U.S. Pat. No. 3,787,384, Strobel et al, U.S. Pat. No. 4,148,754, and Ziegler, deceased, et al, U.S. Pat. No. 4,063,009, describe various olefin polymerization catalysts.

Nowlin et al, U.S. Pat. No. 4,481,301, the entire contents of which are incorporated herein by reference, disclose a supported alpha-olefin polymerization catalyst composition prepared by reacting a support containing OH groups with a stoichiometric excess of an organomagnesium composition, with respect to the OH groups content, and then reacting the product with a transition metal compound.

Furtek, U.S. Pat. No. 4,670,413, discloses a supported alpha-olefin polymerization catalyst composition having an average pore diameter of at least about 170 Angstroms. The productivity of the catalyst and resin melt and high load melt indices ($I_2$ and $I_{21}$, respectively) are higher than those of similar catalyst of lower average pore diameter. Furthermore, the productivity, $I_2$ and $I_{21}$, increase the increasing average pore diameter at an unspecified catalyst particle size. Similarly, polymer density decreases with increasing average pore diameter at an unspecified particle size.

McDaniel, *Fracturing Silica-Based Catalysts During Ethylene Polymerization*, JOURNAL OF POLYMER SCIENCE:POLYMER CHEMISTRY EDITION, Vol. 19, 1967–76 (1981), teaches that the activity of a supported titanium (Ti) and magnesium (Mg)-containing olefin polymerization catalyst increases until the average silica support pore diameter reaches 400 Angstroms (Å). The particle size of the support is not specified.

Karol et al, European Published Patent Application 84 103441.6, Publication No. 0 120 503, disclose that olefin polymerization catalyst activity can be improved by using a silica support having average pore sizes of at least 80, preferably at least 100 Å, and an unspecified particle size.

Shida et al, POLYMER PREPRINTS (ACS Div. Poly. Chem.) 24(1), pages 110–111 (1983), teach that silica support has an effect on the molecular weught of the resins produced with the silica-supported chromium-based olefin polymerization catalysts. However, this effect is missing in the magnesium- and titanium-containing catalysts. Similarly, Hogan et al JOURNAL OF APPLIED POLYMER SCIENCE: APPLIED POLYMER SYMPOSIUM, 36, 49–60 (1981), disclosed that an increase in pore size of chromium-based olefin polymerization catalysts increases melt index of the resin produced with the catalyst.

One of the important properties of blown and cast films and injection-molded articles made from olefinic polymer resins is the strength of such films and articles. As is known to those skilled in the art, resin strength properties are inversely related to the MFR values thereof. Thus, resins having lower MFR values are likely to have better strength properties than similar resins of higher MFR values. Accordingly, workers in the art continue to search for ways of producing resins having relatively low MFR values.

It is a primary object of the present invention to prepare a high activity supported catalyst for the polymerization of olefins, particularly alpha-olefins, which produces polymers having relatively low MFR values.

Additional objects of ther present invention will become apparent to those skilled in the art from the following description.

SUMMARY OF THE INVENTION

I surprisingly found that a supported catalyst composition having an average pore diameter of about 20 to about 300 Å, at a substantially constant catalyst particle size, produces olefinic polymer resins having MFR values of about 25 to about 50. The MFR of the resins decreases with the decreasing average catalyst pore diameter at a substantially constant catalyst particle size. The catalyst particle size must be constant to such an extent that the $R^2$ value of the regression plot of MFR as a function of the catalyst average pore diameter is greater than 60%. This is surprising since the effect of catalyst pore diameter, at a substantially constant catalyst particle size, on MFR of the resin was unknown. In fact, the particle size of the catalyst was unknown as a variable having an influence on the properties of the polymers produced with such catalysts.

The supported, olefin, particularly alpha-olefin, polymerization catalyst composition of this invention comprises a transition metal or a compound thereof and a conventional catalyst activator. In a preferred embodiment, the catalyst composition also contains magnesium or a compound thereof. The catalyst composition has the aforementioned average pore diameter at a substantially constant catalyst particle size.

In one of the more preferred embodiments, the solid, porous carrier is first contacted with a magnesium compound, the resulting intermediate is contacted with a transition metal compound, and the resulting precursor is contacted with a catalyst activator.

In the most preferred embodiment, the catalyst composition is synthesized in a multi-step process substantially similar to that of Nowlin et al, U.S. Pat. No. 4,481,301, with the exception, of course, that the carrier (also referred to herein as a "support") has such an average pore diameter that the resulting catalyst has the aforementioned average pore diameter at a substantially constant particle size. In the first step, a solid, porous carrier having reactive OH groups is reacted with a liquid containing at least one organomagnesium composition having the empirical formula:

wherein R and R' are the same or different $C_1$–$C_{12}$ hydrocarbyl groups, provided that R', but not R, may also be a halogen, and n is 0, 1 or 2. The number of moles of the organomagnesium composition is in excess of the number of moles of the OH group on the carrier.

In the second step, the liquid is carefully removed, e.g., evaporated, to produce a supported magnesium composition in the form of a dry, free-flowing powder.

In the third step, the powder is reacted with at least one transition metal compound dissolved in a liquid medium. The number of moles of the transition metal compound in the liquid medium is greater than the number of the OH groups on the carrier before the carrier is reacted in the first step with the organomagnesium composition. As a result of this step, a reacted form of transition metal becomes supported on the carrier.

The invention is also directed to a method of making the catalyst, to an olefin, particularly alpha-olefin, polymerization process conducted in the presence of the catalyst composition of this invention and to the polymers produced thereby.

DETAILED DESCRIPTION OF THE INVENTION

Figure 1:
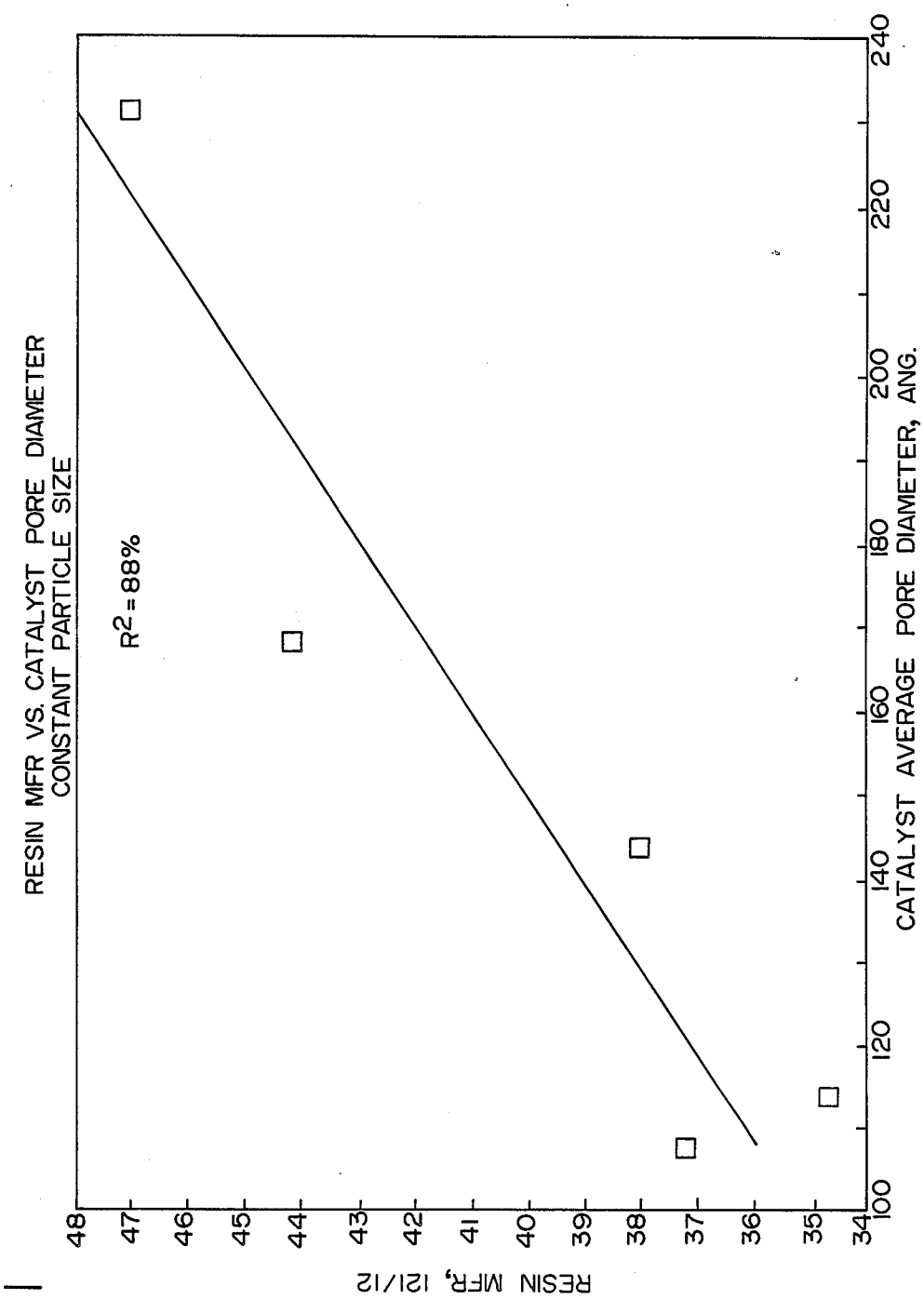
FIG. 1 is a linear regression plot of the effect of the catalyst pore diameter on MFR of the resin produced with the catalyst of this invention. The $R^2$ value for this plot is 88%.

The catalyst composition of this invention must have the average pore diameter and must be prepared with a solid, porous carrier having the corresponding average pore diameters at a substantially constant particle size as follows:

|  | Average Pore Diameter (Angstroms) | | |
| --- | --- | --- | --- |
|  | General | Preferred | Most Preferred |
| Carrier | about 30–about 400 | about 80–about 300 | about 120–about 250 |
| Catalyst | about 20–about 300 | about 50–about 200 | about 90–about 150 |

The term "substantially constant particle size" as used herein means that the particle size of the catalyst within a given range of the average pore size thereof is constant as defined by the span of the particle size distribution being less than about 0.5. The span is defined as:

$$\text{Span} = \frac{D(90) - D(10)}{D(50)}$$

where D(90), D(10) and D(50) are the 90, 10 and 50 percentiles, respectively, of the cumulative particle size distribution. Only when catalyst particle size is maintained substantially constant, the $R^2$ value of the regression plot of the polymer MFR as a function of the catalyst average pore size is greater than 60%, preferably greater than 70%, more preferably greater than 80%, and most preferably it is about 85 to about 100%. In one preferred embodiment, the particle size of the catalyst is maintained constant at 90 microns ($\mu$) and the range of the average pore sizes of the catalyst is about 110 to 230 Å. The term "$R^2$", as used herein, means the proportion of the variability in the data that is explained by the linear regression line, see N. R. Draper and H. Smith, APPLIED REGRESSION ANALYSIS, 2nd Edition, John Wiley and Sons, New York (1981), page 33, the contents of which are incorporated herein by reference.

The average pore diameter, in Angstroms, of the carrier can be determined in any conventional manner, known to those skilled in the art. For example, it can be calculated from the following equation:

$$\text{diameter} = \frac{40,000 \, xPV}{SA}$$

where
PV is sample pore volume (cc/gram)
SA is sample surface area (m²/gram)

Surface area is measured using nitrogen adsorption at liquid nitrogen temperatures, for example, by the BET method, described by S. Brunauer, P. Emmett, E. Teller in the *Journal of the American Chemical Society*, Vol. 60, page 303, 1938, the entire contents of which are incorporated herein by reference. Pore volume can also be measured using nitrogen adsorption or water titration in the manner known to those skilled in the art.

Polymers prepared in the presence of the catalysts of this invention are homopolymers of ethylene or copolymers of ethylene and higher alpha-olefins. At a substantially constant catalyst particle size, as defined above, the MFR of the polymer decreases with decreasing catalyst average pore size. Thus, polymers having desirable strength properties as indicated by decreasing values of MFR, can be produced by selecting catalyst compositions having lower average pore diameters at a substantially constant particle size. Polymers prepared with the catalysts of this invention are particularly useful for blown film, cast film and injection molding applications. The MFR of such polymers is about 25 to about 50, preferably about 25 to about 40 and most preferably about 24 to about 35, for LLDPE products having a density of about 0.915 to about 0.925 g/cc.

Catalysts of the present invention are described below in terms of the manner in which they are made.

Carrier materials which may be used in the present invention are solid, porous materials, such as silica, alumina, silica-alumina, and combinations thereof, so long as the average diameter thereof is of the size specified above at a substantially constant particle size, also as defined above. The carriers usually have the form of particles having a particle size of about 1 to about 150 microns, preferably about 10 to about 100 microns. Preferably, the carrier is in the form of spherical particles, e.g., spray-dried silica. The internal porosity of the carriers is about 70%. The surface area of the carriers is about 250 to about 350 m²/gn, preferably about 280 to about 320 m²/gm.

Physically-bound water is removed from the carrier prior to the contact thereof with the organomagnesium composition. The water is removed, for example, by heating the carrier at ambient pressure in an atmosphere of fry air or inert gas, such as nitrogen for 1 to about 24 hours, at temperature of about 100° C. to the upper temperature limit represented by the temperature at which change of state or sintering occurs. Suitable heating temperature is about 100° C. to about 850° C., preferably about 150° C. to about 800° C. and most preferably about 600° C. to about 800° C.

Specific examples of suitable carriers are silica materials available from the PQ Corporation, Lafayette Hill, Pa., under the tradenames of Cs 2133 and CS 3131, and silicas available from the Davison Chemical Division of W. R. Grace and Co. under the trademarks of Davison 952 or Davison 955, which are treated by any known conventional method(s), e.g., by mechanical sieving, to produce a support which has such an average pore diameter that the catalyst composition made with the support has the aforementioned average pore diameter at a substantially constant particle size. As will be apparent to those skilled in the art, the substantially constant particle size of the support—and thus of the catalyst—is easily achieved by the aforementioned conventional method(s).

Suitable transition metal compounds used herein are compounds of a transition metal of Groups IVA, VA, VIA, VII A or VIII of the Periodic Chart of the Elements, as published by the Fisher Sicentific company, Catalog No. 5-702-10, 1978. Such compounds are any transition metal compounds used heretofore in Ziegler and Ziegler-Natta catalyst compositions. Non-limiting examples of such transition metal compounds are compounds of titanium, vanadium, molybdenum, zirconium or chromium, e.g., $TiCl_4$, $TiCl_3$, $VCl_4$, $VCl_3$, $VOCl_3$, dialkoxyvanadium dichlorides, $MoCl_5$, $ZrCl_4$ and chromiumacetylacetonate. Of these compounds, the compounds of titanium and vanadium are preferred, and the compounds of titanium are most preferred.

Suitable magnesium compounds used in the preferred embodiment are also any magnesium compounds used heretofore in Ziegler and Ziegler-Natta catalyst compositions. Non-limiting examples of such compounds are magnesium halide or organomagnesium compositions, such as $MgCl_2$, $MgI_2$, and Grignard reagents having the empirical formula:

$$RMgR'$$

where R is a $C_1$-$C_{12}$ hydrocarbyl group, and R' is a halogen.

The carrier is contacted with the transition metal compound in any conventional manner used heretofore to contact the carrier with the transition metal compound in synthesizing Ziegler and Ziegler-Natta catalysts. Thus, the carrier is usually contacted with a solution of the transition metal in a suitable solvent in which the transition metal is at least partially soluble and which is liquid at reaction temperatures. Suitable solvents are those used heretofore in such synthesis, e.g., those disclosed by Stevens et al, U.S. Pat. No. 3,787,384; Ziegler, deceased et al, U.S. Pat. No. 4,063,009; Anderson et al, U.S. Pat. No. 4,076,698; Strobel et al, U.S. Pat. No. 4,148,754; Melquist, U.S. Pat. No. 4,154,701; Graff, U.S. Pat. No. 4,173,547; Shida et al, U.S. Pat. No. 4,263,171; and, Nowlin et al, U.S. Pat. No. 4,481,301, the entire contents of all of which are incorporated herein by reference. Suitable non-limiting examples of solvents are alkanes, such as hexane, n-heptane, octane, nonane and decane.

Similarly, in the preferred embodiment of the invention wherein a magnesium compound is first reacted with the carrier, prior to the reaction of the resulting product with the transition metal compound, the carrier is contacted with the magnesium compound in any conventional manner used heretofore to contact the carrier with the magnesium compound in synthesizing Ziegler and Ziegler-Natta catalysts. Thus, the carrier is usually contacted with a solution of the magnesium compound in suitable solvents. Such solvents are those used heretofore in the synthesis of Ziegler and Zeigler-Natta polymerization catalyst compositions, as also disclosed in the aforementioned patents to Stevens et al, Ziegler, deceased et al, Anderson et al, Strobel et al, Melquist, Graff, Shida et al and Nowlin et al. Suitable non-limiting examples of solvents are ethers, such as aliphatic ethers, e.g., diethyl ether, diisopropyl ether, dibutyl ether, dipentyl ether, and cyclic ethers, such as tetrahydrofuran and dioxane.

In one preferred embodiment, the catalyst precursor composition is prepared according to Karol et al, European Published Patent Application 84103441.6, filed Mar. 28, 1984, Publication No. 0 120 503, published Oct. 3, 1984, the contents of which are incorporated herein by reference. The synthesis of this precursor composition is summarized below.

The catalyst compositions of this preferred embodiment are produced by forming a precursor composition from a magnesium compound, a titanium compound, and an electron donor compound; diluting said precursor composition with an inert carrier; and activating the diluted precursor composition with an organoaluminum compound.

The precursor composition is formed by dissolving at least one titanium compound and at least one magnesium compound in at least one electron donor compound at a temperature of from about 20° C. up to the boiling point of the electron donor compound. The titanium compound(s) can be added to the electron donor compound(s) before or after the addition of the magnesium compound(s), or concurrently therewith. The dissolution of the titanium compound(s) and the magnesium compound(s) can be facilitated by stirring, and in some instances by refluxing, these two compounds in the electron donor compound(s). After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 mol to about 10 mols, of the magnesium compound(s)

are used per mol of the titanium compound(s) in preparing the precursor composition.

The titanium compound(s) employed in preparing the precursor composition has the structure $$Ti(OR)_aX_b$$

wherein

R is an aliphatic or aromatic hydrocarbon radical containing from 1 to 14 carbon atoms, or COR' where R' is an aliphatic or aromatic hydrocarbon radical containing from 1 to 14 carbon atoms, X is selected from the group consisting of Cl, Br, I, and mixtures thereof, a is 0, 1 or 2, b is 1 to 4 inclusive, and $a+b=3$ or 4.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$, preferably $TiCl_3$.

The magnesium compound(s) employed in preparing the precursor composition has the structure $$MgX_2$$

wherein X is selected from the group consisting of Cl, Br, I, and mixtures thereof.

Suitable magnesium compounds include $MgCl_2$, $MgBr_2$ and $MgI_2$. Anhydrous $MgCl_2$ is particularly preferred.

The electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds include the alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds include methyl formate, ethyle acetate, butyl acetate, ethyl ether, tetrahydrofuran, dioxane, acetone and methyl ethyl ketone.

After the precursor composition has been prepared it is diluted with an inert carrier material by (1) mechanically mixing or (2) impregnating the precursor into the carrier material.

Mechanical mixing of the inert carrier and precursor composition is effected by blending these materials together using conventional techniques. The blended mixture suitably contains from about 3 percent by weight to about 50 percent by weight of the precursor composition.

Impregnation of the inert carrier material with the precursor composition may be accomplished by dissolving the precursor composition in the electron donor compound, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolated the precursor composition from said solution. The excess electron donor compound is then removed by drying at temperatures up to about 85° C.

The blended or impregnated precursor composition has the formula $$Mg_mTi(OR)_nX_p[ED]_q$$

wherein

R is an aliphatic or aromatic hydrocarbon radical containing from 1 to 14 carbon atoms, or COR' wherein R' is also an aliphatic or aromatic hydrocarbon radical containing from 1 to 14 carbon atoms, X is selected from the group consisting of Cl, Br, I, and mixtures thereof, ED is an electron donor compound, m is 0.5 to 56, preferably 1.5 to 5, n is 0, 1 or 2, p is 2 to 116, preferably 6 to 14, and q is 2 to 85, preferably 3 to 10.

Suitably, the impregnated carrier material contains from about 3 percent by weight to about 50 percent by weight, preferably from about 10 percent by weight to about 30 percent by weight, of the precursor composition.

The carrier materials employed to dilute the precursor composition are those discussed above. The diluted precursor composition is activated with a catalyst activator, such an any of the well known alkylaluminum activators, discussed elsewhere in this application.

The invention will now be described in conjunction with the catalyst of the embodiment used in Examples set forth below. However, it will be apparent to those skilled in the art that it the invention is not limited to this embodiment and that all of the embodiments of the invention can be practiced in accordance with the description thereof contained herein. Polymers prepared in the presence of the embodiment of the catalyst of the Examples, referred to herein as the most preferred embodiment of the invention, have MFR values of about 34 to about 47, which is higher than the most preferred range of MFR values for the blown and cast films and injection molding applications discussed above.

In the most preferred embodiment, suitable organomagnesium compositions, transition metal compounds, e.g., tetravalent titanium compounds, and solvents used in the catalyst synthesis and the manner of synthesizing the catalyst are those diclosed by Nowlin et al, U.S. Pat. No. 4,481,301, except, of course, that a suitable support is used to obtain a catalyst composition having the pore size and the particle size required by this invention. Accordingly, only the most important features of such materials and of the manner of conducting the catalyst synthesis steps will be discussed herein.

Chemically bound water and excess OH groups, e.g., as represented by the presence of the OH groups in the carrier, may be present when the carrier is contacted with water-reactive organomagnesium compositions or compounds in accordance with the present invention. Excess OH groups present in the carrier may be removed by heating the carrier, prior to the contacting step, for a sufficient time at a sufficient temperature to accomplish the desired degree of the OH groups removal. A relatively small number of OH groups is removed by sufficient heating at from about 150° C. to about 250° C., whereas a relatively large number of OH groups may be removed by sufficient heating at at least 500° or 600° C., preferably from about 750° C. to about 850° C. The heating is continued for about 4 to about 16 hours. The amount of the hydroxyl groups in silica may be determined according to the method disclosed by J. B. Peri and A. L. Hensley, Jr., in J. Phys. Chem., 72 (8) 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

A dehydrated carrier material is treated with a solution of a solid organomagnesium composition in a liquid, the organomagnesium composition being capable of reacting with tetravalent titanium compound. The organomagnesium composition has the empirical formula $R_nMgR'_{(2-n)}$, where R and R' are the same or different $C_1$–$C_{12}$ hydrocarbyl groups, preferably $C_1$–$C_{12}$ alkyl groups, most preferably $C_1$–$C_{12}$ unsubstituted alkyl groups, yet more preferably $C_1$–$C_4$ alkane groups, and most preferably $C_2$–$C_4$ alkane groups, provided that R', but not R, may be a halogen, and n is 0, 1 or 2. If R' is a halogen, it is preferably chlorine, bromine or iodine, and most preferably chlorine, and n is 0, 1 or 2. Most preferably, in this embodiment, a solution of such an organomagnesium composition is a Grignard reagent and the carrier material is contacted with the solution thereof in the absence of ball milling.

Preferably, the carrier is treated with the aforementioned solution in such a manner that, after the treatment is completed, the carrier has magnesium incorporated into the pores thereof. As used herein, the concept of incorporating a material onto a carrier is intended to encompass the incorporation of the material (e.g., magnesium or titanium compositions) onto the carrier by physical or chemical means. Accordingly, the incorporated material need not necessarily be chemically bound to the carrier. A preferred means of incorporating the magnesium is by adding a porous carrier to a liquid medium containing a dissolved organomagnesium composition of the formula $R_nMgR'_{(2-n)}$ and to maintain it in the suspension for about 0.1 to about 10, preferably about 0.5 to about 5, and most preferably for about 1.0 to about 2.0 hours (hrs) at a temperature of about 25 to about 200, preferably about 50 to about 100, and most preferably about 60° to about 80° C. As a result of this treatment, magnesium becomes incorporated into the pores of the carrier. More particularly, the magnesium is incorporated into the pores of the carrier by: (1) a chemical reaction of the organomagnesium composition with the carrier, (2) a precipitation of magnesium from the organomagnesium composition onto the carrier or (3) a combination of such a reaction and precipitation.

Suitable solvents for Grignard reagents are ethers, such as aliphatic ethers, e.g., diethyl ether, diisopropyl ether, dibutyl ether, dipentyl ether and ethyl-n-butyl ether and cyclic ethers, such as tetrahydrofuran and dioxane. Thus, the liquid medium containing the organomagnesium composition is usually an ether, preferably tetrahydrofuran.

It is important for the purposes of the most preferred embodiment of the present invention that the number of moles of the organomagnesium composition in the solution used to contact the carrier be in excess of the number of moles of the OH groups on the carrier, so that the molar ratio of the organomagnesium composition in the solution to the hydroxyl groups is greater than 1.0, preferably it is from about 1.1 to about 3,5, more preferably from about 1.5 to about 3.5, and most preferably from about 2.0 to about 3.5.

It is also important for the purposes of the most preferred embodiment of the present invention, that the number of moles of the sum of all magnesium-containing compounds on the carrier, in the product of the second step of the catalyst synthesis of this embodiment, be in excess of the number of moles of the OH groups originally present on the carrier prior to the contact of the carrier with the liquid containing the organomagnesium composition. The molar ratio of the sum of all magnesium-containing compounds in the product of the second step to the aforementioned OH groups is greater than 1, preferably it is from about 1.1 to about 3.5, more preferably from about 1.5 to about 3.5, and most preferably from about 2.0 to about 3.5.

To assure that most, if not all, of the magnesium-containing compound(s) are retained on the carrier, the liquid is removed from the reaction vessel with care to assure that none or very little magnesium-containing compound(s) are removed with it. The liquid may be removed by any means assuring that substantially all of the magnesium-containing compound(s) remain on the carrier, e.g., by distillation of the mixture of the impregnated carrier and the solvents, evaporation, decantation or centrifugation. Evaporation is about the boiling point of the liquid is the most preferred method of liquid removal. It is also important that the product of the second synthesis step of this embodiment not be subjected to washing or rinsing, so that the excess of the magnesium-containing compound or compounds which did not react with the hydroxyl (OH) groups of the carrier is retained on the carrier.

After the liquid is removed, the resulting product may be dried by any conventional means, e.g., at ambient temperature or at 50°–80° C. for about 12–16 hours with a stream of dry nitrogen to produce a dry, free-flowing powder.

The amount of magnesium-containing compound(s) which is incorporated onto the carrier should be sufficient to react with the transition metal compounds. The preferred transition metal compounds used in the most preferred embodiment of the invention are tetravalent titanium compounds. Thus, the most preferred embodiment will be described hereinafter in conjunction with the use of such tetravalent titanium compounds. The amount of magnesium-containing compound(s) incorporated onto the carrier must be sufficient to react with the tetravalent titanium to incorporate a catalytically effective amount of titanium on the carrier in the manner set forth hereinbelow. Thus, the carrier should comprise from about 0.1 to about 50, preferably aboout 0.1 to about 5 millimoles (mmols) of magnesium per gram of carrier (after the treatment of the carrier with the organomagnesium composition is completed).

The free-flowing powder obtained in the second step is reacted with at least one tetravalent titanium compound dissolved in a liquid medium diluent. The titanium compound is soluble in this liquid reaction medium, while the treated carrier (i.el, the free-flowing powder), including the magnesium-containing compound(s), is insoluble in this liquid reaction medium.

Thus, the reaction which takes place between the tetravalent titanium and the reactive magnesium-containing compound(s) is a reaction of a solid with a liquid. It is further noted that the reacted titanium is insoluble in the liquid reaction medium.

Without wishing to be bound by any theory of operability, it is thought that the reaction which takes place between the magnesium compound which is not a reaction product of an organomagnesium composition with the carrier and the tetravalent titanium in the liquid reaction medium is substantially an oxidation/reduction reaction, wherein the magnesium compound acts as a reducing agent for the tetravalent titanium. On the other hand, while not wishing to be bound by any particular operability theory or chemical mechanism, the reaction which takes place between (1) tetravalent titanium and (2) the reaction product of an organomagnesium composition and the carrier containing reactive OH groups is not an oxidation/reduction reaction. However, both of the reactions lead to the incorporation of titanium onto the carrier.

The tetravalent titanium compound or compounds used in the most preferred embodiment are any titanium compounds soluble in the liquid medium used in the third catalyst synthesis step, such as titanium halides, e.g., titanium tetrachloride, $TiCl_4$, titanium tetrabromide, $TiBr_4$, titanium alkoxides, wherein the alkoxide moiety has a branched or unbranched alkyl radical of 1 to about 20 carbon atoms, preferably 1 to about 6 carbon atoms. The most preferred titanium compound is titanium tetrachloride.

Mixtures of such titanium compounds may also be used and generally no restrictions are imposed on the titanium compounds which may be included. Any titanium compound that may be used alone may also be used in conjunction with other titanium compounds.

Suitable liquid medium diluents are materials in which the tetravalent titanium compounds are at least partially soluble and which are liquid at reaction temperatures. Preferred diluents are alkanes, such as hexane, n-heptane, octane, nonane, and decane, although a variety of other materials including cycloalkanes, such as cyclohexane, aromatics, such as benzene and ethylenebenzene, and halogenated and hydrogenated aromatics, such as chlorobenzene or ortho-dichlorobenzene, can be employed. The most preferred diluent is n-heptane. Prior to use, the diluent should be purified, e.g., by percolation through silica gel and/or molecular sieves, to remove traces of water, oxygen, polar compounds, and other materials capable of adversely affecting catalyst activity. The magnesium-containing dry, free-flowing powder is reacted with one or more tetravalent titanium compound(s) at a temperature and for a time sufficient to yielld a solid catalyst component. Temperatures at which this reaction is conducted range from about $-40°$ to about 250° C., preferably, from about 0° to about 170° C., and most preferably the reaction is conducted at a temperature of 25°–100° C. Suitable reaction times range from about $\frac{1}{2}$ to about 25 hours, with about $\frac{1}{2}$ to about 6 hours being preferred.

The reaction of the tetravalent titanium in the liquid medium with the magnesium-containing carrier material takes place by slurrying the carrier material in a solution of the tetravalent titanium compound in the diluent and heating the liquid reaction medium to a suitable reaction temperature, e.g., to the reflux temperature of the diluent at standard atmospheric pressure.

Thus, the reaction may take place under reflux conditions.

The various reaction parameters can be widely varied, suitable selection of such parameters being well within those having ordinary skill in the art. The volume of the tetravalent titanium compound solution added to the magnesium-containing powder initially slurried in the solution is from about 0.1 to about 10 milliliters (mls) per gram (gm) of such carrier. The concentration of the titanium compound solution is, for example, from about 0.1 to about 5 Molar.

As indicated above, the catalysts of the present invention are prepared in the substantial absence of water, oxygen, and other catalyst poisons. Such catalyst poisons are excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of any diluents employed in the first and third preparative steps in the manner described above is also helpful in this regard.

It may also be possible to replace, in the most preferred embodiment of the inventin, some or all of the above-mentioned tetravalent titanium compounds with one or more other transition metal compounds. Such other transition metal compounds are exemplified in Graff et al, U.S. Pat. No. 4,173,547, column 6, lines 55–60. Preferred transition metal compounds, other than the tetravalent titanium compounds, are zirconium compounds (e.g., $ZrCl_4$).

The thus-formed supported catalyst precursor of any of the embodiments of this invention is activated with suitable activators, also known as co-cocatalysts or catalyst promoters. The activators are known in the art and they include any of the materials commonly employed as promoters for olefin polymerization catalyst components containing compounds of the Group IB, IIA, IIB, IIB and IVB of the Peridic Chart of the Elements, published by Fisher Scientific Company, Catalog Number 5-702-10, 1978. Examples of such promoters are metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures of such compounds can also be used. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferred for use according to this invention are the Group IIIB metal alkyls and dialkylhalides having 1 to 20 carbon atoms per alkyl radical. More preferably, the promoter is a trialkylaluminum compound having 1 to about 6 carbon atoms per alkyl group. The most preferred promoter is triethylaluminum.

The organometallic promoter is employed in an amount which is at least effective to promote the polymerization activity of the solid component of the catalyst of this invention. Preferably, at least about three parts by weight of promoter are employed per part, by weight, of solid catalyst component, although higher ratios, such as 10:1, 25:1, 100:1 or higher also are suitable and often give highly beneficial results. In slurry polymerization processes, a portion of the promoter can be employed to pretreat the polymerization medium if desired. Other promoters which can be used herein are disclosed in Stevens et al, U.S. Pat. No. 3,787,384, column 4, line 45 to column 5, line 12, and in Strobel et al, U.S. Pat. No. 4,148,754, column 4, line 56 to column 5, line 59.

The catalyst may be activated in situ by adding the activator and catalyst separately to the polymerization medium. It is also possible to combine the catalyst and activator before introduction thereof into the polymerization medium, e.g., for up to about 2 hours prior to the introduction thereof into the polymerization medium at a temperature of from about −40° to about 100° C.

A suitable activating amount of the activator may be used to promote the polymerization activity of the catalyst. The aforementioned proportions of the activator can also be expressed in terms of the number of moles of activator per gram atom of titanium in the catalyst composition, e.g., from about 1 to about 100, preferably about 5 to about 100 moles of activator per gram atom of titanium. Alpha-olefins may be polymerized with the catalysts prepared according to the present invention by any suitable process. Such processes include polymerizations carried out in suspension, in solution or in the gas phase. Gas phase polymerization reactions ae preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at a relatively low temperatures, e.g. from about 30° to 105° C. The molecular weight control is evidenced by a measurable positive change in melt index ($I_2$) of the polymer produced.

The catalysts prepared according to the present invention are highly active, their productivity is at least about 1,000, and can be as high as about 6,000, grams of polymer per mole of titanium per 100 psi of ethylene per hour (g/mmole Ti 100 psi $C_2$=.hr).

The polymers prepared in accordance with the present invention may be homopolymers of ethylene or copolymers of ethylene with one or more $C_3$-$C_{10}$ alpha-olefins. Thus, copolymers having two monomeric units are possible as well as terpolymers having three momomeric units. Particular examples of such polymers include ethylene/1-butene copolymers, ethylene/1-hexane copolymer, ethylene/4-methyl-1-pentene copolymers, ethylene/1-butene/1-hexene terpolymers, ethylene/propylene/1-hexane terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred polymers are copolymers of ethylene and 1-hexene.

The linear low density polyethylene (LLDPE) polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating the same is described by Levine et al, U.S. Pat. No. 4,011,382, and Karol et al, U.S. Pat. No. 4,302,566, the entire contents of both of which are incorporated herein by reference, and by Nowlin et al. U.S. Pat. No. 4,481,301.

The following Examples further illustrate the essential features of the invention. However, it will be apparent to those skilled in the art that the specific reactants and reaction conditions used in the Examples do not limit the scope of the invention.

EXAMPLE 1

(Catalyst Synthesis)

All procedures were carried out in glass or quartz equipment under purified nitrogen using predried nitrogen-purged solvents.

Catalyst Preparation

First Step:

15 grams of CS 1040 silica available from PQ Corporation, heated at 800° C. in the atmosphere of dry nitrogen for about 18 hours, was placed into a flask under a slow nitrogen purge. The silica had average pore diameter of 148 Å, and particle size of about 90 microns ($\mu$). Approximately 300 mll of dry hexane was added while stirring and the contents were heated to reflux. 10 ml of a 25% wt. solution of ethylmagnesium chloride in tetrahydrofuran (THF) was added dropwise to the refluxing solution. The reflux was continued for 60 minutes. Then, the solvent was removed by evaporation at about 60° C. and the product was dried at 60° C. for about 1 hour in a nitrogen atmosphere to yield a free-flowing powder. Yield: 18 grams (gm); Mg=1.10 mmols/gram (mM/gm); THF=0.62 mM/gm; Cl=0.72 mM/gm.

Second Step:

10 grams of the product from the first step (10 mmols Mg) was placed into a 500 ml flask under a slow nitrogen purge. 300 ml of dry heptane was added to the flask and the contents slurried for about 5 minutes. 5 ml of titanium tetrachloride (TiCl$_4$) was added to the flask and the slurry was heated to reflux for about 1 hour. The catalyst was filtered and washed 10 times with 50 ml of portions of dry hexane. The product was dried overnight at room temperature in nitrogen atmosphere. Yield: 20 grams of product which analyzed as follows: Mg=1.1 mmols/gram; Ti=0.58 mmols/gram; Cl=3.4 mmols/gram; THF=0.50 mmols/gram. The produced catalyst had average pore size of 108 Å and particle size of 90$\mu$.

EXAMPLES 2-5

(Additional Catalyst Synthesis)

Four (4) more catalyst samples were synthesized in accordance with the procedure of Example 1 on silica supports having the same particle size as that of Example 1, but varying average pore diameters. Silica supports, their physical characteristics and the physical characteristics of the resulting catalyst compositions are summarized in Table I.

EXAMPLES 6-10
(Preparation of LLDPE Products)

TABLE I
PHYSICAL PROPERTIES OF SILICA SUPPORTS AND CORRESPONDING CATALYSTS

| | Silica | | | | Catalyst | | | | | |
|---|---|---|---|---|---|---|---|---|---|---|
| Example | Silica Support | Surface Area ($m^2$/gm) | Pore Volume (cc/gm) | Average Pore Diameter (Ang.) | Surface Area ($m^2$/gm) | Pore Volume (cc/gm) | Average Pore Diameter (Ang.) | Particle Size ($\mu$) | [Mg] (mm/gm) | [Ti] (mm/gm) |
| 1 | CS 1040 | 309 | 1.14 | 148 | 278 | 0.75 | 108 | 90 | 1.1 | 0.58 |
| 2 | CS 1832 | 307 | 1.54 | 200 | 260 | 0.74 | 114 | 90 | 1.1 | 0.85 |
| 3 | CS 1231 | 348 | 1.58 | 182 | 245 | 0.88 | 144 | 90 | 1.2 | 0.71 |
| 4 | CS 2133 | 331 | 2.13 | 257 | 350 | 1.47 | 167 | 90 | 1.1 | 0.82 |
| 5 | CS 3131 | 304 | 2.61 | 343 | 295 | 1.72 | 235 | 90 | 1.0 | 0.68 |

Linear low density polyethylene product were prepared in a 1-liter autoclave. In a typical experiment (Example 6), the autoclave was heated under a nitrogen purge to about 90° C. for 1 hour and then cooled to ambient temperature. About 700 mililiters (ml) of hexane and 45 grams of 1-hexene were added while stirring at about 750 rpm. (The total volume of hexane and hexene was about 750 ml in each experiment.) The catalyst was prepared for study by adding about 0.2 grams of the catalyst of Example 1 to a dry, nitrogen blanketed catalyst addition flask. About 1 ml of 25% by volume of triethylaluminum (TEAL) in hexane was added to the autoclave.

The autoclave was then heated to about 70° C. and hydrogen added to give an increase in pressure of about 20 psig. The autoclave was then heated at about 5° C./minute to 80° C. At this temperature, ethylene was introduced into the reactor giving the total pressure of 100 psig. After hexane saturation by ethylene was complete, the dry catalyst was washed into the reactor with about 10 ml of hexane.

The ethylene was introduced through a Hastings Mass Flowmeter NALL-50KG/CC-420 interfaced with a strip chart recorder to monitor ethylene flow (gms/minute) as a function of time (minutes).

At the end of the polymerization time, about 30 minutes, the autoclave was cooled to room temperature, opened and the contents placed in a large container. About 300 ppm of Irganox 1076 was added as a hexane solution and volatiles allowed to evaporate under a hood. Polymer yield was about 150 grams.

Table II summarizes the polymerization conditions and properties of the products.

Figure 2:
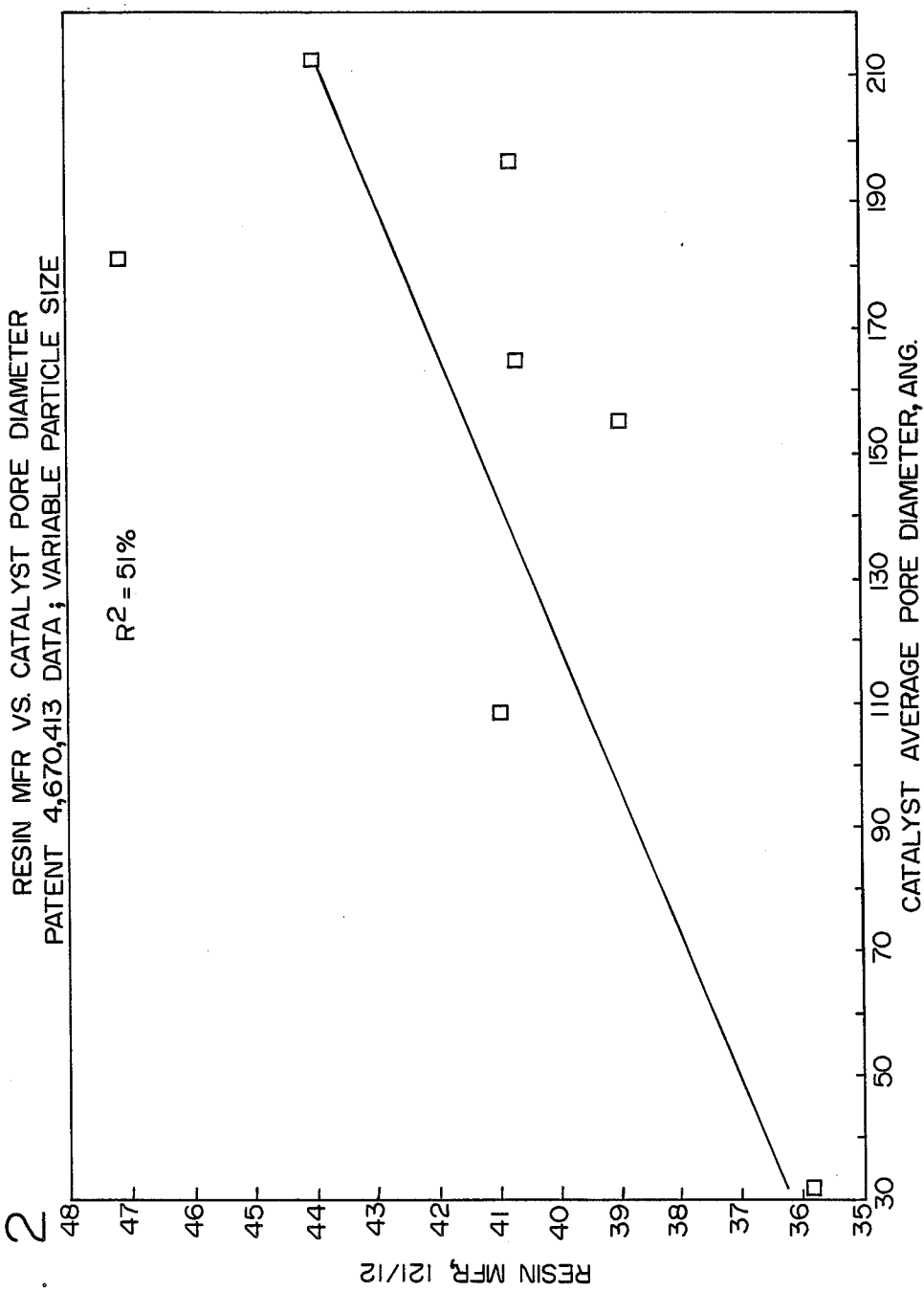
FIG. 2 is a linear regression plot of the effect of the average catalyst pore diameter on MFR of the resin produced with a catalyst distinct from that of the present invention, disclosed and claimed by me in a previously issued U.S. Pat. No. 4,670,413, wherein the catalyst particle size was not controlled. The $R^2$ value for this plot is 51%.

The results of the data presented in Table II are also presented graphically in FIG. 1. The data shows that MFR decreases substantially as the pore diameter of the catalyst, and hence of the silica used in its preparation, decreases at a constant catalyst particle size of 90$\mu$. Calculated polymer density values in Table II were standardized to 1.0 Melt Index (MI), $I_2$, in the manner described by Elston, U.S. Pat. No. 3,645,992, the entire contents of which are incorporated herein by reference, because MI is known to inversely affect resin density. For example, resin of lower MI is likely to have lower density than an equivalent resin of higher MI. The $R^2$ value for the data of FIG. 1 is 88%. In contrast, FIG. 2, is a linear regression plot of the MFR as a function of average catalyst pore diameter from the data of my U.S. Pat. No. 4,670,413, wherein the catalyst particle size was not maintained constant. The $R^2$ value for the data for FIG. 2 is only 51%. The comparison of the $R^2$ values of FIGS. 1 and 2 indicates that the constant catalyst particle size is a statistically signficant variable in correlating molecular weight distribution of the polymer to the catalyst average pore size since the data of FIG. 2 indicates that there is approximately the same probablilty of correlating the effect of catalyst pore size to resin MFR, as there is of not correllating it. In contrast, according to the data of FIG. 1, the probablilty of correctly correllating MFR to the catalyst pore size is 88%.

TABLE II
POLYMER MFR AS A FUNCTION OF CATALYST PORE DIAMETER

| Example | Catalyst Of Example | Catalyst Avg. Pore Diameter (Å) | Catalyst Particle Size ($\mu$) | Density (gm/cc) | Avg. Density Corrected to 1MI (gm/cc) | MFR |
|---|---|---|---|---|---|---|
| 6 | 1 | 108 | 90 | 0.919 | 0.918 | 37.2 |
| 7 | 2 | 114 | 90 | 0.917 | 0.915 | 34.6 |
| 8 | 3 | 144 | 90 | 0.918 | 0.915 | 37.9 |
| 9 | 4 | 167 | 90 | 0.918 | 0.915 | 44.3 |
| 10 | 5 | 235 | 90 | 0.918 | 0.914 | 47.2 |

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. In a process of preparing a supported olefin polymerization catalyst composition comprising a transition metal or a compound thereof and a catalyst activator, an improvement comprising using such a support that the catalyst composition has an average pore diameter of about 20 to about 300 Angstroms at a substantially constant particle size, so that the span of the particle size distribution of the catalyst is less than about 0.5.

2. A process of claim 1 wherein the catalyst composition also comprises magnesium or a compound thereof.

3. A process of claim 2 wherein the supported catalyst composition has an average pore diameter of about 50 to about 200 Angstroms.

4. A process of claim 3 wherein the supported catalyst composition has an average pore diameter of about 90 to about 150 Angstroms.

5. A process of claim 4 wherein the catalyst composition is prepared by:
(a) contacting a solid, porous carrier with a magnesium compound; and
(b) contacting the product of said step (a) with a transition metal compound.

6. A process of claim 5 wherein the magnesium compound is a halide-containing magnesium compound or an organomagnesium compound.

7. A process of claim 6 wherein the supported catalyst composition is prepared by a process comprising the steps of:
(i) contacting a solid, porous carrier having reactive OH groups with a liquid containing at least one organomagnesium composition having the empirical formula:

$$R_n MgR'_{(2-n)}$$

where R and R' are the same or different $C_1$-$C_{12}$ hydrocarbyl groups, provided that R', but not R, may also be a halogen, and n is 0, 1 or 2, the number of moles of said organomagnesium composition being in excess of the number of moles of said OH groups on said carrier;
(ii) evaporating said liquid from step (i) to produce a supported magnesium composition in the form of a dry, free-flowing powder; and
(iii) reacting said powder of step (ii) with at least one transition metal compound in a liquid medium, the number of moles of said transition metal compound being in excess of the number of the OH groups on said carrier prior to the reaction of the carrier with said organomagnesium composition in step (i), said transition metal compound being soluble in said liquid medium, and said supported magnesium composition being substantially insoluble in said liquid medium, whereby a reacted form of transition metal which is insoluble in said liquid medium becomes supported on said carrier.

8. A process of claim 7 wherein the catalyst composition produces such polymers in which the $R^2$ value of the regression plot of MFR as a function of the catalyst average pore diameter is greater than 60%.

9. A process of claim 8 wherein the $R^2$ value is greater than 70%.

10. A process of claim 9 wherein the $R^2$ value is greater than 80%.

11. A process of claim 10 wherein the $R^2$ value is about 85 to about 100%.

12. A process of claim 11 wherein the $R^2$ value is 88%.

13. A process of claim 12 wherein the supported catalyst composition has a constant particle size of about 90 microns.

14. A process of claim 13 wherein said step (i) comprises:
(a) slurrying the carrier in a non-Lewis base liquid; and
(b) adding to the slurry resulting from said step (a) the organomagnesium composition in the form of an ether solution thereof.

15. A process of claim 14 wherein the ether is tetrahydrofuran.

16. A process of claim 15 wherein the catalyst is supported on a porous, solid carrier which is silica, alumina or combinations thereof.

17. A process of claim 16 wherein the porous, solid carrier is silica.

18. A process of claim 17 wherein the transition metal compound is a tetravalent titanium compound.

19. A process of claim 18 wherein the tetravalent titanium compound is $TiCl_4$.

20. A process of claim 19 wherein, in said step (i), the ratio of the number of moles of said organomagnesium composition to the number of moles of the OH groups on said silica is from about 1.1 to about 3.5.

21. A process of claim 20 wherein, in said step (i), the ratio of the number of moles of said organomagnesium composition to the number of moles of the OH groups on said silica is about 2.0 to about 3.5.

22. A process of claim 21 wherein said liquid medium is an alkane, cycloalkane, aromatics or halogenated aromatics.

23. A process of claim 22 wherein said liquid medium is hexane.

24. A process of claim 23 wherein, prior to contacting the silica in step (i), it is heated at a temperature of about 750° C. for at least four hours.

25. A process of claim 24 wherein the organomagnesium composition is ethylmagnesium chloride.

26. In an olefin polymerization catalyst composition supported on a solid, porous carrier, comprising a transition metal or a compound thereof, and a catalyst activator, an improvement comprising using such a solid, porous carrier that the catalyst composition has an average pore diameter of about 20 to about 300 Angstroms at a substantially constant particle size such that the span of the particle size distribution of the catalyst is less than about 0.5.

27. A catalyst composition of claim 26 which has an average pore diameter of about 50 to about 200 Angstroms.

28. A catalyst composition of claim 27 which has an average pore diameter of about 90 to about 150 Angstroms.

29. A catalyst composition of claim 28 which also comprises magnesium or a compound thereof.

30. A catalyst composition of claim 29 wherein it is prepared by:
(a) contacting a solid, porous carrier with a magnesium compound; and
(b) contacting the product of said step (i) with a transition metal compound.

31. A catalyst composition of claim 30 wherein it is prepared by a process comprising the steps of:
(i) contacting a solid, porous carrier having reactive OH groups with a liquid containing at least one organomagnesium composition having the empirical formula:

$$R_n MgR'_{(2-n)}$$

where R and R' are the same or different $C_1$-$C_{12}$ hydrocarbyl groups, provided that R', but not R, may also be a halogen, and n is 0, 1 or 2, the number of moles of said organomagnesium composition being in excess of the number of moles of said OH groups on said carrier;

(ii) evaporating said liquid from step (i) to produce a supported magnesium composition in the form of a dry, free-flowing powder; and (iii) reacting said powder of step (ii) with at least one transition metal compound in a liquid medium, the number of moles of said transition metal compound being in excess of the number of the OH groups on said carrier prior to the reaction of the carrier with said organomagnesium composition in step (i), said transition metal compound being soluble in said liquid medium, and said supported magnesium composition being substantially insoluble in said liquid medium, whereby a reacted form of transition metal which is insoluble in said liquid medium becomes supported on said carrier.

32. A catalyst composition of claim 31 which produces such polymers in which the $R^2$ value of the regression plot of MFR as a function of the catalyst average pore diameter is greater than 60%.

33. A catalyst composition of claim 32 wherein the $R^2$ value is greater than 70%.

34. A catalyst composition of claim 33 wherein the $R^2$ value is greater than 80%.

35. A catalyst composition of claim 34 wherein the $R^2$ value is about 85 to about 100%.

36. A catalyst composition of claim 35 wherein the $R^2$ value is 88%.

37. A catalyst composition of claim 36 wherein the supported catalyst composition has a constant particle size of about 90 microns.

38. A catalyst composition of claim 37 wherein the porous, solid carrier is silica.

39. A catalyst composition of claim 33 wherein the transition metal compound is a tetravalent titanium compound.

40. A catalyst composition of claim 39 wherein the tetravalent titanium compound is $TiCl_4$.

41. A catalyst composition of claim 40 wherein, in said step (i), the ratio of the number of moles of said organomagnesium composition to the number of moles of the OH groups on said silica is about 2.0 to about 3.5.

42. A catalyst composition of claim 41 wherein the organomagnesium composition is ethylmagnesium chloride.

43. A process of claim 4 wherein the supported catalyst composition is prepared by forming a precursor composition from a magnesium compound, a titanium compound, and an electron donor compound, diluting the precursor composition with an inert carrier, and activating the diluted precursor composition with the catalyst activator.

44. A process of claim 43 wherein the titanium compound has the structure:

$$Ti(OR)_aX_b$$

wherein
R is an aliphatic or aromatic hydrocarbon radical containing 1 to 14 carbon atoms or COR', where R' is an aliphatic or aromatic hydrocarbon radical containing from 1 to 14 carbon atoms,
X is selected from the group consisting of Cl, Br, I, and mixtures thereof,
a is 0, 1 or 2, b is 1 to 4, inclusive, and a+b=3 or 4.

45. A process of claim 44 wherein the titanium compound is $TiCl_3$, $TiCl_4$, $Ti(OCH_3)Cl_3$, $Ti(OC_6H_5)Cl_3$, $Ti(OCOCH_3)Cl_3$ or $Ti(OCOC_6H_5)Cl_3$.

46. A process of claim 45 wherein the titanium compound is $TiCl_3$.

47. A process of claim 46 wherein the magnesium compound has the structure:

$$MgX_2$$

wherein X is Cl, Br, I or mixtures thereof.

48. A process of claim 47 wherein the magnesium compound is $MgCl_2$, $MgBr_2$ or $MgI_2$.

49. A process of claim 48 wherein the magnesium compound is anhydrous $MgCl_2$.

50. A process of claim 49 wherein the electron donor compound is an alkyl ester of an aliphatic carboxylic acid, an alkyl ester of an aromatic carboxylic acid, an aliphatic ether, a cyclic ether or an aliphatic ketone.

51. A process of claim 50 wherein the electron donor compound is methyl formate, ethyl acetate, butyl acetate, ethyl ether, tetrahydrofuran, dioxane, acetone or methyl ethyl ketone.

52. A process of claim 51 wherein the supported catalyst composition has the formula:

$$Mg_mTi(OR)_nX_p[ED]_q$$

wherein
R is an aliphatic or aromatic hydrocarbon radical containing from 1 to 14 carbon atoms, or COR' wherein R' is an aliphatic or aromatic hydrocarbon radical containing from 1 to 14 carbon atoms,
X is selected from the group consisting of Cl, Br, I, and mixtures thereof,
ED is an electron donor compound,
m is 0.5 to 56, preferably 1.5 to 5,
n is 0, 1 or 2,
p is 2 to 116, preferably 6 to 14, and
q is 2 to 85, preferably 3 to 10.

53. A catalyst composition of claim 27 prepared by forming a precursor composition from a magnesium compound, a titanium compound, and an electron donor compound, diluting the precursor composition with an inert carrier, and activating the diluted precursor composition with the catalyst activator.

54. A catalyst composition of claim 53 wherein the titanium compound has the structure:

$$Ti(OR)_aX_b$$

wherein
R is an aliphatic or aromatic hydrocarbon radical containing 1 to 14 carbon atoms or COR', where R' is an aliphatic or aromatic hydrocarbon radical containing from 1 to 14 carbon atoms,
X is selected from the group consisting of Cl, Br, I, and mixtures thereof,
a is 0, 1 or 2, b is 1 to 4, inclusive, and a+b=3 or 4.

55. A catalyst composition of claim 54 wherein the titanium compound is $TiCl_3$, $TiCl_4$, $Ti(OCH_3)Cl_3$, $Ti(OC_6H_5)Cl_3$, $Ti(OCOCH_3)Cl_3$ or $Ti(OCOC_6H_5)Cl_3$.

56. A catalyst composition of claim 55 wherein the titanium compound is $TiCl_3$.

57. A catalyst composition of claim 56 wherein the magnesium compound has the structure:

$$MgX_2$$

wherein X is Cl, Br, I or mixtures thereof.

58. A catalyst composition of claim 57 wherein the magnesium compound is MgCl$_2$, MgBr$_2$ or MgI$_2$.

59. A catalyst composition of claim 58 wherein the magnesium compound is anhydrous MgCl$_2$.

60. A catalyst composition of claim 59 wherein the electron donor compound is an alkyl ester of an aliphatic carboxylic acid, an alkyl ester of an aromatic carboxylic acid, an aliphatic ether, a cyclic ether or an aliphatic ketone.

61. A catalyst composition of claim 60 wherein the electron donor compound is methyl formate, ethyl acetate, butyl acetate, ethyl ether, tetrahydrofuran, dioxane, acetone or methyl ethyl ketone.

62. A catalyst composition of claim 61 having the formula:

$$Mg_mTi(OR)_nX_p[ED]_q$$

wherein

R is an aliphatic or aromatic hydrocarbon radical containing from 1 to 14 carbon atoms, or COR' wherein R' is an aliphatic or aromatic hydrocarbon radical containing from 1 to 14 carbon atoms, X is selected from the group consisting of Cl, Br, I, and mixtures thereof, ED is an electron donor compound, m is 0.5 to 56, preferably 1.5 to 5, n is 0, 1 or 2, p is 2 to 116, preferably 6 to 14, and q is 2 to 85, preferably 3 to 10.

* * * * *